(12) United States Patent
Krothapalli et al.

(10) Patent No.: US 8,225,592 B1
(45) Date of Patent: Jul. 24, 2012

(54) MICROJET NOISE SUPPRESSION SYSTEM FOR JET ENGINES

(75) Inventors: Anjaneyulu Krothapalli, Tallahassee, FL (US); Brenton Greska, Tallahassee, FL (US)

(73) Assignee: Florida State University Research Foundation, Tallahassee, FL (US)

(*) Notice: Subject to any disclaimer, the term of this patent is extended or adjusted under 35 U.S.C. 154(b) by 962 days.

(21) Appl. No.: 12/157,332

(22) Filed: Jun. 9, 2008

Related U.S. Application Data

(63) Continuation-in-part of application No. 10/864,281, filed on Jun. 9, 2004, now abandoned.

(60) Provisional application No. 60/933,515, filed on Jun. 7, 2007, provisional application No. 60/477,065, filed on Jun. 9, 2003.

(51) Int. Cl.
*F02K 1/00* (2006.01)
(52) U.S. Cl. .......... 60/231; 244/1 N; 181/210; 181/218; 181/220
(58) Field of Classification Search .................... 60/770, 60/231, 785; 239/265.17, 265.19, 265.23; 244/207, 1 N, 51, 52; 181/210, 213, 220, 181/221, 218
See application file for complete search history.

(56) References Cited

U.S. PATENT DOCUMENTS

| | | | | |
|---|---|---|---|---|
| 2,685,936 A * | 8/1954 | Brenneman et al. | ......... | 181/218 |
| 2,948,148 A * | 8/1960 | Bertin et al. | .................... | 73/147 |
| 2,990,905 A * | 7/1961 | Lilley | ............................ | 181/220 |
| 3,227,240 A * | 1/1966 | Lee et al. | ....................... | 181/217 |
| 3,229,460 A * | 1/1966 | Jones | ....................... | 239/265.23 |
| 3,463,402 A * | 8/1969 | Langston, Jr. | ........... | 239/265.13 |
| 3,630,313 A * | 12/1971 | Smith | .......................... | 181/218 |
| 4,168,763 A * | 9/1979 | White et al. | .................. | 181/218 |
| 5,092,425 A * | 3/1992 | Shaw, Jr. | ....................... | 181/213 |
| 6,308,898 B1 * | 10/2001 | Dorris et al. | ............. | 239/265.17 |
| 7,055,329 B2 * | 6/2006 | Martens et al. | ................. | 60/772 |

* cited by examiner

*Primary Examiner* — Ted Kim
*Assistant Examiner* — Andrew Nguyen
(74) *Attorney, Agent, or Firm* — Peter Loffler

(57) ABSTRACT

A jet engine noise suppression system uses a plurality of microjets that are located on a frame downstream of the exhaust port of a jet engine. Each microjet issues a microjet flow, either liquid or gas, directed at the main jet flow issued by the engine. The mass of the combined microjet flow is substantially smaller than the mass of the jet engine flow. The angle of at which each microjet issues its flow may be variable. The microjets may be located on a pop-up head of a blast deflector or on a upstanding rack.

10 Claims, 6 Drawing Sheets

MICROJET NOISE SUPPRESSION SYSTEM FOR JET ENGINES

This application claims the benefit of provisional patent application No. 60/933,515 filed on Jun. 7, 2007, which provisional application is incorporated herein by reference, and is a Continuation-in-Part of utility patent application Ser. No. 10/864,281, filed on Jun. 9, 2004 now abandoned, which claims the benefit of provisional patent application 60/477,065 filed on Jun. 9, 2003, all incorporated herein by reference.

BACKGROUND OF THE INVENTION

1. Field of the Invention

The present invention relates to a noise suppression system for jet engines whereby a plurality of microjets pulse a microjet output at the main exhaust stream emanating from the microjet, the microjets being located either directly on the aircraft or externally of the aircraft.

2. Background of the Prior Art

Although jet engines have become quieter over the years, noise produced by jet engines continues to be a problem for many especially at and near airports where the jet plane is on or near the ground and where jet pressure is high either to achieve V-2 takeoff speed or for reverse thrust to brake an airplane. As many airports are located in urban and suburban areas with development constantly encroaching, jet engine noise is a sizable problem. Efforts are continually being made to reduce jet engine noise at and around airports. Similarly, on an aircraft carrier, a jet aircraft typically goes to maximum engine thrust just prior to aircraft launch in order to have sufficient air speed to sustain flight immediately after launch. This maximum thrust results in a very high noise output.

The far-field noise of a supersonic jet is comprised of four major noise components. The first noise component is a high frequency short wavelength field that is coherent in phase and is commonly referred to as Mach waves. These Mach waves have plane phase fronts and are confined to a definite wedge sector and emanate from a region within the first few exhaust diameters downstream of the jet exhaust nozzle exit. These waves are generated by small-scale disturbances, or eddies, that are convected at supersonic speeds such that they emanate the Mach waves in the direction defined by a disturbance convection velocity and the atmospheric speed of sound. Surrounding these waves by a gas stream that has a speed that is greater than the speed of sound eliminates these waves.

The second noise component is a highly directional disturbance peaking at smaller angles relative to the jet axis (or at larger angles relative to the inlet axis). This noise field is generated from large-scale instabilities that reach peak amplitude in the region that is somewhat upstream of the end of the potential core. This source of noise is associated with the unsteady flow that is on a scale that is comparable with the local shear layer width. The spectral intensity of this sound field consists of two distinct peaks. One peak is associated with the highly directional Mach waves characterized by high positive pressure peaks in the far-field microphone signal. These Mach waves are of significant strength as compared to those that originate very close to the jet exit. This intense radiation is observed to emanate from a region that is between about 5-10 jet nozzle diameters and is associated with supersonically traveling large-scale coherent regions of vorticity. The far-field intensity contributions of this source is about 30 percent of the total intensity. The sources of the second sound field peak appear to located farther downstream (about 10-20 nozzle diameters) and are associated with unsteady flow generated by the large structures that are similar to those in subsonic jets.

The third noise field is at all angles relative to the jet axis and is at higher frequencies. This sound is generated in precisely the same manner as in subsonic flow by the conventional chaotic turbulence.

The fourth noise field is commonly referred to as shock-associated noise and it occurs in non-ideally expanded jets. The far-field noise spectrum associated with this noise typically consists of discrete peaks which represent the screech tones and a broad peak that is associated with the shock-associated broadband noise.

Attacking these noise components helps reduce the noise output from a jet engine.

SUMMARY OF THE INVENTION

The microjet noise suppression system for jet engines of the present invention helps reduce jet engine noise by attacking the various components of the far-field noise of the jet.

High pressure microjets are introduced for the suppression of the dominant large scale mixing noise source of a jet. These microjets introduce either an output stream, which stream may be steady or pulsed or a combination thereof, which stream is either gaseous or aqueous. The microjet stream is injected into the primary jet stream at and beyond the nozzle exit in order to manipulate the dominant source region, which region typically extends from about 5 to about 20 nozzle diameters from the nozzle exit. The interaction of the microjet jet stream or pulse interacts with the jet shear layer and reduces the turbulence levels in the noise producing region of the jet. The microjet jet stream or pulse influences the mean velocity profiles such that the peak normalized vorticity in the shear layer is significantly reduced which induces a stabilizing effect.

The microjet noise suppression system of the present invention is comprised of a jet engine that has an exhaust port from which the jet engine issues a first jet flow having a first jet flow mass. A plurality of discrete microjets is located on a frame, each microjet fluid flow connected to a source of high pressure liquid or gas stream and each microjet simultaneously issuing a continuous second jet flow directed at the first jet flow at one or more angles relative to the first jet flow and beyond the boundary of the first jet flow and ambient air immediately adjacent the exhaust port of the jet. Each second jet flow has a second jet flow mass, such that the combined second jet flow masses are much smaller than the first jet flow mass and such that the combined second jet flows interact with the first jet flow in order to disrupt a far-field noise component of the first jet flow. A control system is connected to the plurality of microjets for adaptively controlling the microjets. A sensor may be used for providing input data to the control system for use by the control system in providing adaptive control of the plurality of microjets. Each second jet flow is supersonic. The one or more angles at which the microjets issue their respective jet flow may be variable. The frame which holds the microjets may be attached to a pop-up head assembly of a blast deflector or may be a component of an upstanding rack.

BRIEF DESCRIPTION OF THE DRAWINGS

Similar reference numerals refer to similar parts throughout the several views of the drawings.

DESCRIPTION OF THE PREFERRED EMBODIMENT

Figure 1:
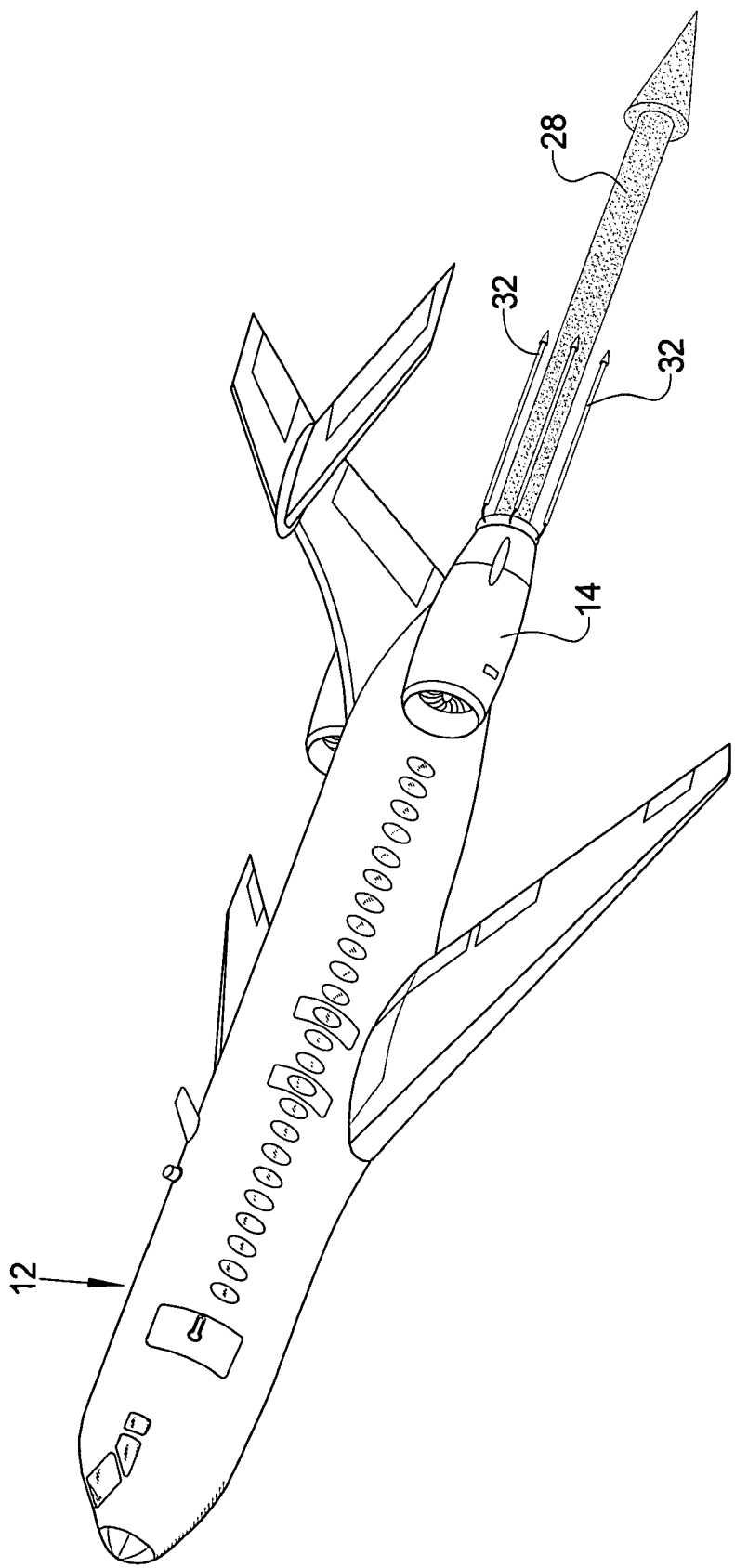
FIG. 1 is an environmental view of the microjet noise suppression system for jet engines employed on a typical commercial jet aircraft.
Figure 2:
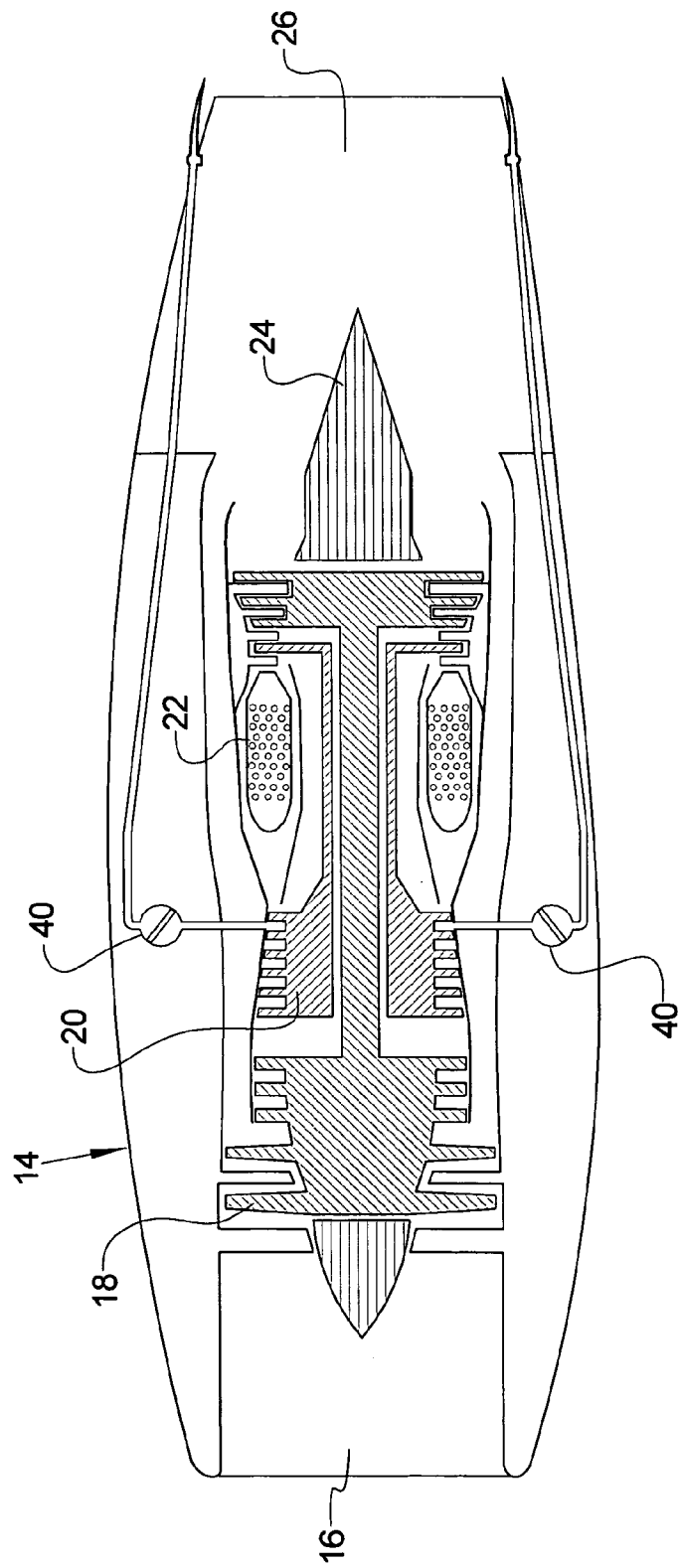
FIG. 2 is a schematic view of the microjet noise suppression system for jet engines utilizing bleed air for microjet exhaust stream issuance.
Figure 3:
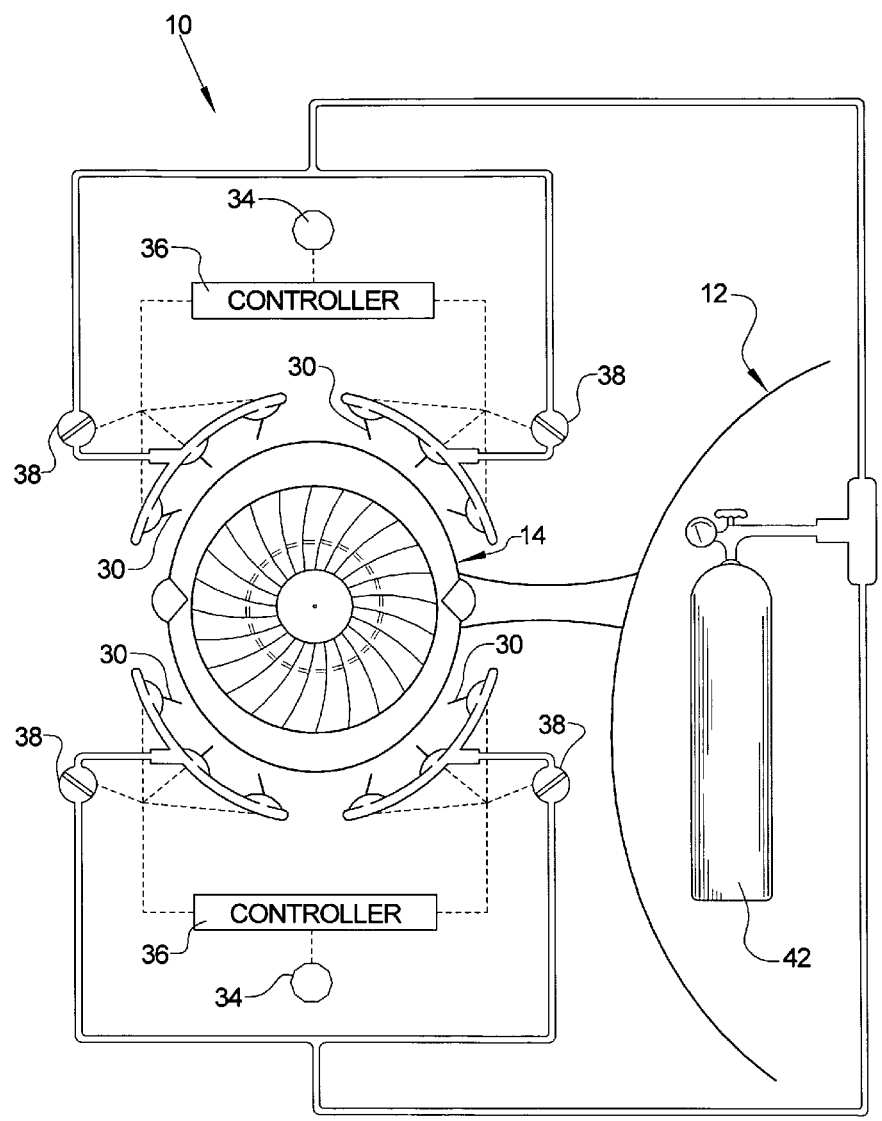
FIG. 3 is an elevation schematic view of the microjet noise suppression system for jet engines, wherein the microjet exhaust stream is provided by a compressed exhaust stream source.

Referring now to the drawings, it is seen that the microjet noise suppression system for jets of the present invention, generally denoted by reference numeral 10, is installed on a typical jet aircraft 12, which can be a typical commercial aircraft (Boeing 717, 737, 747, 757, Airbus A300, etc.), a military jet aircraft, either transport (C141, etc.), or fighter (F14, FA18, etc.), or a general aviation jet aircraft (Learjet, Gulfstream etc.), wherein one or more jets 14 provide forward thrust for the aircraft 12. As seen in FIG. 2, a typical jet 14 has several major components including an inlet 16 for drawing working air into the jet 14, a low pressure compressor 18, a high pressure compressor 20, a burner can 22, an exhaust cone 24, and an exhaust 26 from where jet exhaust 28 issues. It is understood that other jet configurations are possible and that the above is illustrative of a general jet architecture.

At least one microjet 30 is located downstream of most of the main components of the jet 14 which microjets issue a jet stream 32, which stream 32 may be a continuous stream or may be a pulsed stream, and which stream 32 is significantly smaller in mass (typically less than about 2 percent of the main jet exhaust 28 mass) relative to the exhaust 28 of the main jet 14. The microjets 30 may be located circumferentially about an outer circumference of the main jet 14. The microjets 30 each have their respective jet stream 32 issue toward the main jet 14 exhaust stream 28 beyond the boundary of the main jet flow of the engine and the ambient air immediately adjacent the exhaust 28. If desired, some of the microjets 30 may be positioned at a first angle relative to the main jet exhaust 28 such that these microjets 30 issue their exhaust stream 32 at a first angle relative to the main jet exhaust 28, and other microjets 30 are positioned at a second angle relative to the main jet exhaust 28 such that these second microjets 30 issue their exhaust stream 32 at a second angle relative to the main jet exhaust 28. In such a configuration, some microjets 30 issue their exhaust stream 32 toward a first point of the main jet exhaust 28 while other microjets 30 issue their exhaust stream 32 toward a second point of the main jet exhaust 28, which may be several exhaust diameters downstream of the first point, in order to attack different components of the main jet exhaust 28 noise components. Alternately, each microjet 30 or each bank of microjets 30 can be controlled by an appropriate servo motor (not illustrated) that can dynamically alter the angle of each microjet 30 or bank of microjets 30 with respect to the main jet exhaust 28 in order to alter the angle of the microjet exhaust 32 relative to main jet exhaust 28. One or more appropriate sensors 34 may be located on the jet 14 or on another point of the aircraft 12 in order to monitor various factors of the issuing main jet 14 (decibel output, airflow, vibration, etc.), in order to control the angle of each microjet 30 or microjet bank with respect to the main jet exhaust 28. One or more appropriate controllers 36 control the various servo motors as well as control valves 38 that are associated with each microjet 30 or microjet bank in order to control input to each microjet 30 or microjet bank, and thus exhaust stream 32 output from each microjet 30 or microjet bank. This allows some microjets 30 to issue an exhaust stream 32 while disabling other microjets 30 from so issuing. The particular control of each control valve 38 being environmentally specific and may be automatically controlled by the avionics of the aircraft 12 or may be under the control of the pilot of the aircraft 12.

Each microjet is fluid flow connected to a source of high pressure exhaust stream, which, as illustrated in FIG. 2, may be to a source of high pressure bleed air that is tapped into the high pressure compressor 20 area of the main jet 14. An appropriate control valve 40 enables and disables access to this source of high pressure air as needed. Alternately, a separate source of high pressure exhaust may be located on the aircraft 12 and be housed within a suitable housing 42, such as a high pressure gas or aqueous matter canister, which canister 42 may hold either an appropriate gas (air, etc.), or an appropriate liquid (water, etc.), that is used to issue the microjet exhaust stream 32.

In operation, the microjet noise suppression system for jet engines 10 has one or more microjets 30 positioned about the main jet 14 of the aircraft 12, advantageously, downstream of the main jet compressors 18 and 20. The exhaust stream 32 that issues from each microjet 30 is positioned either at a fixed angle relative to the main jet exhaust 28, or is positioned such that the servo motors alter the angle of the exhaust stream 32 as conditions warrant. Each microjet 30 is fluid flow connected to a source of a high pressure stream (either gas or liquid) and when the jet 14 is operational, the microjets 30 issue an exhaust stream 32 at the main jet exhaust stream 28 in order to reduce the noise components of the main jet 14. As noted earlier, the stream 32 may be a steady stream, a pulsed stream, or a combination of both, however, continuous flow of the microjets is preferred. The microjets need not be out of phase with one another if pulsed. The controller 36 controls all aspects of the system 10, including the angle of each microjet 30 (if variable) as well as the on and off sequencing of each microjet 30 or bank of microjets 30. The sensors 34 provide operational input to the controller 36 for proper control of the system 10. Each microjet 30 can issue its exhaust stream 32 as a continuous exhaust stream or each exhaust stream can be pulsed as desired. The controller 36, via the various control valves 38 and/or 40 helps in creating the pulsed streams 32.

Figure 4:
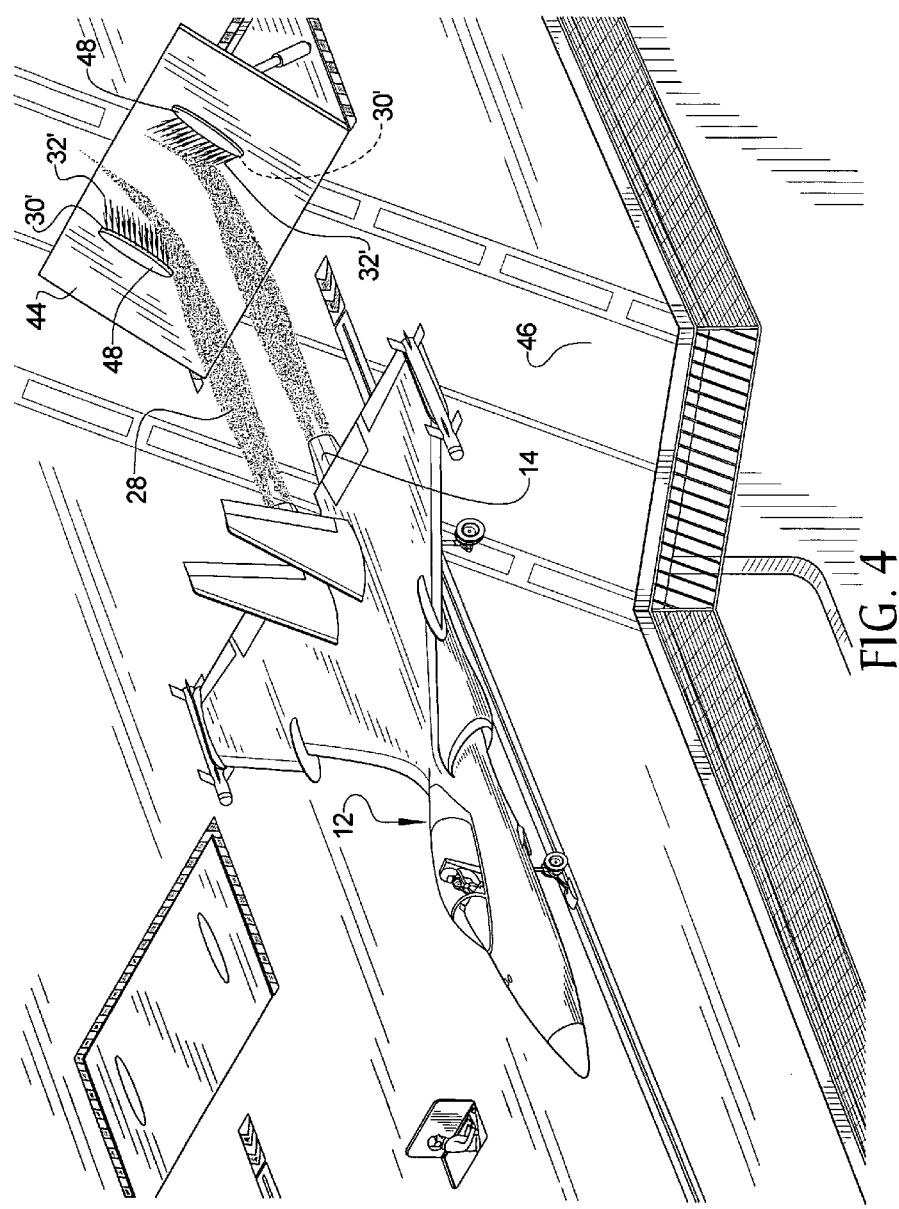
FIG. 4 is a perspective view of the microjet noise suppression system for jet aircraft employed on a jet blast deflector.
Figure 5:
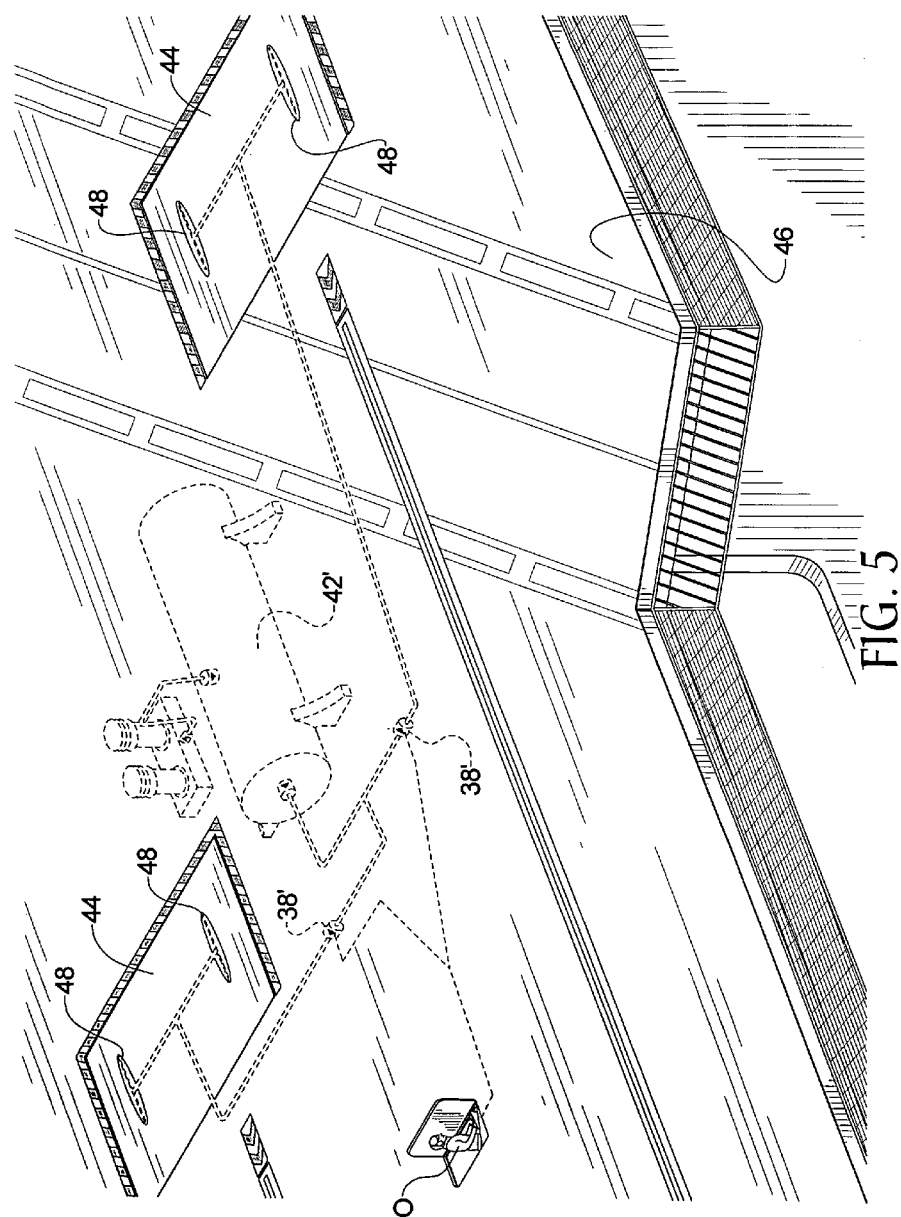
FIG. 5 is a perspective view of the microjet noise suppression system for jet aircraft employed on a jet blast deflector illustrating the basic system layout.
Figure 6:
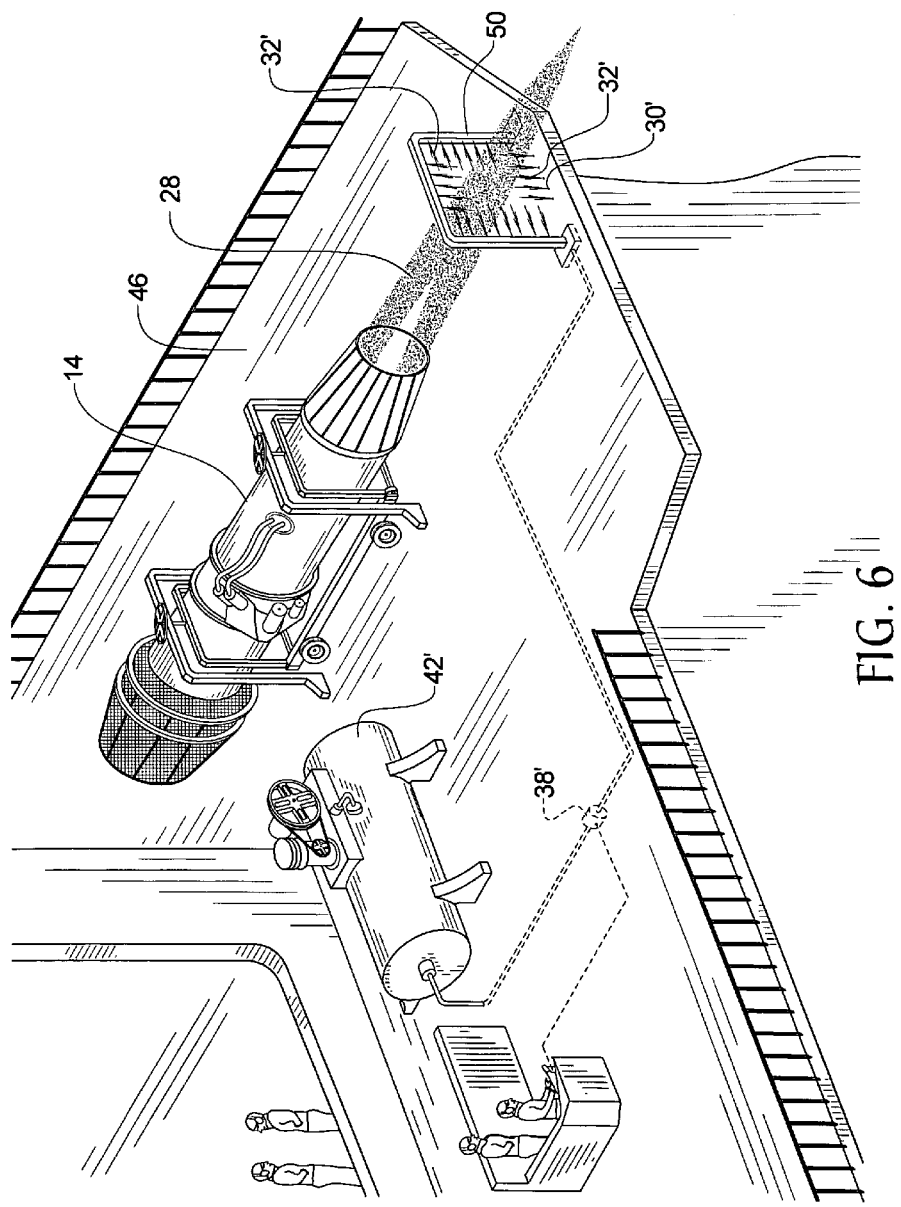
FIG. 6 is a perspective view of microjet noise suppression system for jet aircraft in use for noise control during static engine run-up by a maintenance crew.

As seen in FIGS. 4-6, the microjets 30' may be located external of the aircraft 12. For example, on or more sets of microjets 30' may be located on each blast deflector 44 found on a typical aircraft carrier 46, the particular location being dependent on the types of aircraft launched. Each set of microjets 30' is located on a pop-up head assembly 48 so that the microjets 30' do not cause a protrusion on the flight deck of the aircraft carrier 46 when use of the microjets is not needed. These microjets 30' operate in the same fashion as the aircraft-based microjets 30 described above, such that each of these microjets 30' is fluid flow connected to an appropriate source of high pressure exhaust steam, either gaseous or liquid, which source may be bled off of one of the ship's mechanical systems, or may be a dedicated housing 42' which appropriate control valves 38' controlling fluid flow between the housing (or other source) and each microjet 30' or set of microjets 30' As before, the microjets 30' may be at one or more fixed angles or may have appropriate servo motors associated with them to dynamically adjust the angle of each microjet 30' or set of microjets 30'. As before, the stream 32' issued by these microjets 30' may be a steady stream, a pulsed stream, or a combination thereof, however, as noted earlier, continuous flow of the microjets 30' is preferred and if the microjets 30' are pulsed, they need not be pulsed out of phase as such out of phase pulsing does not enhance system performance. On of the launch officers O may be in charge of controlling the microjet system 10.

As seen, in FIG. 6, the microjets 30' may be locate within the deck of the ship 46 as well as on a rack 50 which rack is located downstream of a jet 14 off-loaded from the aircraft 12. The microjets 30' help control the noise of the jet 14 during static engine run-up by maintenance crews. As before, the microjets 30' are fluid flow connected to an appropriate source of high pressure exhaust steam, either gaseous or liquid, which source may be bled off of one of the ship's mechanical systems, or may be a dedicated housing 42' which appropriate control valves 38' controlling fluid flow between the housing 42' (or other source) and each microjet 30' or set of microjets 30' As before, the microjets 30' may be at one or more fixed angles or may have appropriate servo motors associated with them to dynamically adjust the angle of each microjet 30' or set of microjets 30'. The stream 32' issued by these microjets 30' may be a steady stream, a pulsed stream, or a combination thereof.

While the invention has been particularly shown and described with reference to an embodiment thereof, it will be appreciated by those skilled in the art that various changes in form and detail may be made without departing from the spirit and scope of the invention.

We claim:

1. A microjet system for controlling a far-field noise component of a jet engine that has an exhaust port from which the jet engine issues a first jet flow having a first jet flow mass, the microjet system comprising a plurality of microjets located on a frame, each microjet fluid flow connected to a source of high pressure liquid or gas stream and each microjet simultaneously issuing a continuous second jet flow directed at the first jet flow at one or more angles relative to the first jet flow and beyond the boundary of the first jet flow and ambient air immediately adjacent the exhaust port of the jet, each second jet flow having a second jet flow mass, such that the combined second jet flow masses are smaller than the first jet flow mass, such that the combined second jet flows interact with the first jet flow in order to disrupt a far-field noise component of the first jet flow, and such that each microjet is separately dynamically actively controlled as to its angle so as to vary the angle at which the microjet's second jet flow intercepts the first jet flow and also controllable as to whether the respective microjet issues its second jet flow or prevents issuance of the second jet flow, wherein the frame is attached to a pop-up head assembly of a blast deflector, the blast deflector being selectively extended or retracted and attached to either a ground surface or to a deck of a ship, and wherein the source of high pressure liquid or gas stream is from a source that is separate from the jet engine.

2. The microjet system as in claim 1 further comprising a control system connected to the plurality of microjets for adaptively controlling the microjets.

3. The microjet system as in claim 2 further comprising a sensor for providing input data to the control system for use by the control system in providing adaptive control of the plurality of microjets.

4. The microjet system as in claim 1 wherein each second jet flow is supersonic.

5. The microjet system as in claim 1 in combination with the jet engine.

6. The microjet system as in claim 1 wherein the combined second jet flow masses are less than 20 percent of the first jet flow mass.

7. A method for controlling a far-field noise component noise component of a jet stream comprising the steps of:
providing a jet engine having an exhaust port from which issues a first jet flow having a first jet flow mass;
providing a plurality of microjets and locating each microjet downstream from the exhaust port;
connecting each microjet fluid flow to a source of high pressure liquid or gas steam;
issuing a continuous second jet flow simultaneously from each microjet and directing the second jet flow at the first jet flow at one or more angles relative to the first jet flow beyond the boundary of the first jet flow and ambient air immediately adjacent the exhaust, such that each second jet flow has a second jet flow mass, such that the combined second jet flow masses are smaller than the first jet flow mass, such that the combined second jet flows interact with the first jet flow in order to disrupt the far-field noise component of the first jet flow, and such that each microjet is separately dynamically actively controlled as to its angle so as to vary the angle at which the microjet's second jet flow intercepts the first jet flow and also controllable as to whether the respective microjet issues its second jet flow or prevent issuance of the second jet flow, wherein the microjets are connected to a frame that is attached to a pop-up head assembly of a blast deflector, the blast deflector being selectively extended or retracted and attached to either a ground surface or to a deck of a ship, and wherein the source of high pressure liquid or gas stream is provided from a source that is separate from the jet engine.

8. The method as in claim 7 further comprising the steps of:
providing a control system; and
connecting the control system to the plurality of microjets for adaptively controlling the microjets.

9. The method as in claim 7 wherein each second jet flow is supersonic.

10. The method as in claim 7 wherein the combined second jet flow masses are less than 20 percent of the first jet flow mass.

* * * * *